US006455100B1

United States Patent
Heimann et al.

(12)

(10) Patent No.: US 6,455,100 B1
(45) Date of Patent: Sep. 24, 2002

(54) COATING COMPOSITIONS FOR ELECTRONIC COMPONENTS AND OTHER METAL SURFACES, AND METHODS FOR MAKING AND USING THE COMPOSITIONS

(75) Inventors: Robert L. Heimann, Centralia; William L. Dalton, Moberly, both of MO (US)

(73) Assignee: Elisha Technologies Co LLC, Moberly, MO (US)

( * ) Notice: Subject to any disclaimer, the term of this patent is extended or adjusted under 35 U.S.C. 154(b) by 0 days.

(21) Appl. No.: 09/549,119

(22) Filed: Apr. 13, 2000

Related U.S. Application Data

(60) Provisional application No. 60/129,060, filed on Apr. 13, 1999, and provisional application No. 60/151,995, filed on Sep. 1, 1999.

(51) Int. Cl.[7] .............................. B05D 5/12; B05D 1/36; B05D 3/02; B05D 1/18
(52) U.S. Cl. ................... 427/104; 427/327; 427/376.2; 427/397.7; 427/397.8; 427/404; 427/419.2; 427/431
(58) Field of Search ................... 417/104, 327, 417/376.2, 397.7, 397.8, 419.2, 419.3, 404, 431

(56) References Cited

U.S. PATENT DOCUMENTS

| | | |
|---|---|---|
| 1,068,410 A | 7/1913 | Chubb |
| 1,951,039 A | 3/1934 | Scharschu |
| 2,282,163 A | 5/1942 | Burgwin |
| 2,385,332 A | 9/1945 | Carpenter et al. |
| 2,554,250 A | 5/1951 | Horstman et al. |
| 2,641,556 A | 6/1953 | Robinson |
| 2,799,658 A | 7/1957 | Nickerson |
| 2,803,566 A | 8/1957 | Smith-Johannsen |
| 2,811,473 A | 10/1957 | Allen et al. |

(List continued on next page.)

FOREIGN PATENT DOCUMENTS

| | | |
|---|---|---|
| WO | WO 98/33856 | 8/1998 |
| WO | WO 98/33874 | 8/1998 |
| WO | WO 98/33960 | 8/1998 |

OTHER PUBLICATIONS

Encapsulated Nanoparticles of Iron Metal, K. J. Klabunde, D. Zhang, D.N. Glavee and C.M. Sorensen, G. C. Hadjipanayis—Reprinted from Chemistry of Materials, 1994, 6 pages 784–787.

(List continued on next page.)

Primary Examiner—Michael Barr
(74) Attorney, Agent, or Firm—Michael K. Boyer

(57) ABSTRACT

A method is disclosed for providing inorganic and/or organic coating compositions onto rotor cores to eliminate soldering during aluminum injection. These coatings can also be applied upon electric motor rotors and/or stators laminates as well as other electronic components such as transformers. The disclosed method provides at least one film or layer of a coating composition within channels or bar slots defined by the rotor of the electric motor core/rotor (depending upon the design of the motor the slots can be defined within the rotor or open ended along the longitudinal axis of the rotor). The coating composition is also typically applied upon all exposed surfaces of the rotor, e.g., within the channels and exterior surfaces of the rotor. The coated rotor is then contacted with a molten metal. The coating composition functions to isolate the laminates (e.g., steel) of the rotor from a molten metal (e.g., aluminum and its alloys), which surrounds the rotor and fills the channels thereby embedding the rotor, and prevents the metal from forming an undesirable conductive path typically termed soldering among the individual laminates.

25 Claims, 1 Drawing Sheet

U.S. PATENT DOCUMENTS

| | | | |
|---|---|---|---|
| 2,978,361 A | | 4/1961 | Seidl |
| 3,133,829 A | | 5/1964 | Cupery et al. |
| 3,224,927 A | | 12/1965 | Brown et al. |
| 3,301,701 A | | 1/1967 | Baker et al. |
| 3,372,038 A | | 3/1968 | Weldes et al. |
| 3,583,887 A | | 6/1971 | Steger et al. |
| 3,615,918 A | | 10/1971 | Evans et al. |
| 3,752,689 A | | 8/1973 | Moore, Jr. |
| 3,793,073 A | | 2/1974 | Kitayama et al. |
| 3,796,608 A | | 3/1974 | Pearlman |
| 3,832,204 A | | 8/1974 | Boaz |
| 3,839,256 A | | 10/1974 | Parkinson |
| 3,910,797 A | | 10/1975 | Beers |
| 3,917,648 A | | 11/1975 | McLeod |
| 3,945,862 A | * | 3/1976 | Lee et al. .................. 148/31.5 |
| 3,996,073 A | | 12/1976 | Evans |
| 4,032,366 A | | 6/1977 | Choby, Jr. |
| 4,120,702 A | * | 10/1978 | Akerblom .............. 148/6.15 R |
| 4,255,205 A | | 3/1981 | Morito et al. |
| 4,479,104 A | * | 10/1984 | Ettinger et al. ............. 336/219 |
| 4,496,399 A | | 1/1985 | Haselkorn |
| 4,507,360 A | | 3/1985 | Perfetti |
| 4,517,325 A | | 5/1985 | Perfetti |
| 4,601,765 A | | 7/1986 | Soileau et al. |
| 4,618,377 A | | 10/1986 | Nakamura et al. |
| 4,844,753 A | | 7/1989 | Katayama et al. |
| 4,870,814 A | | 10/1989 | Chacko et al. |
| 4,875,947 A | | 10/1989 | Nakayama et al. |
| 4,942,061 A | * | 7/1990 | Domes ....................... 427/104 |
| 4,947,065 A | | 8/1990 | Ward et al. |
| 5,063,011 A | | 11/1991 | Rutz et al. |
| 5,161,597 A | | 11/1992 | Dohogne |
| 5,182,963 A | | 2/1993 | Perisho et al. |
| 5,213,816 A | | 5/1993 | Smyth, Jr. et al. |
| 5,268,140 A | | 12/1993 | Rutz et al. |
| 5,397,530 A | | 3/1995 | Narasimhan et al. |
| 5,488,984 A | * | 2/1996 | Fahy ........................... 164/91 |
| 5,510,188 A | | 4/1996 | Vockler |
| 5,714,093 A | | 2/1998 | Heimann et al. |
| 5,723,181 A | | 3/1998 | Roberts |
| 5,776,261 A | | 7/1998 | Panyard et al. |
| 5,789,085 A | | 8/1998 | Blohowiak et al. |
| 5,871,668 A | | 2/1999 | Heimann et al. |
| 5,922,413 A | | 7/1999 | Takeda |
| 5,955,201 A | * | 9/1999 | Loudermilk et al. ........ 428/450 |
| 5,961,744 A | | 10/1999 | Yamazaki et al. |
| 6,015,855 A | | 1/2000 | Dalton |
| 6,033,495 A | | 3/2000 | McGowan et al. |
| 6,045,925 A | | 4/2000 | Klabunde et al. |

OTHER PUBLICATIONS

Nanoscale Iron Crystallites Encapsulated in Nonmagnetic Metal Shells, Synthesis, Chemical, and Magnetic Properties of Core/Shell Iron–Indium, Iron–Neodymium, and Related Materials, Dajie Zhang, George Glavee, Kenneth J. Klabunde, George C. Hadjipanayis, and Christopher M. Sorensen, High Temperature and Materials Science, vol. 36, 1996, pp. 93–115.

Nanoscale Magnetic Particles, New Methods to Surface Protected Metallic and Immiscible Bimetallic Clusters/Particles—Kathie A. Eason, Kenneth J. Blabunde and Christopher M. Sorensen and George C. Hadjipanaysis—Polyhedron vol. 13, No. 8, pp. 1197–1223, 1994.

A Description of the Functions and Process Tests for Cast Aluminum Induction Motor Squirrel Cage Rotors—J. Herb Johnson—Rotor Technology '86, Feb. 5–7, 1986, Indianapolis, Indiana.

* cited by examiner

COATING COMPOSITIONS FOR ELECTRONIC COMPONENTS AND OTHER METAL SURFACES, AND METHODS FOR MAKING AND USING THE COMPOSITIONS

CROSS-REFERENCE TO RELATED PATENTS AND PATENT APPLICATIONS

The subject matter of this invention is related to commonly assigned U.S. Pat. Nos. 5,714,093; 5,871,668; 6,015,855; and U.S. patent application Ser. No. 09/016,853 now U.S. Pat. No. 6,190,779, filed on Jan. 30, 1998 and entitled "Corrosion Resisitant Containing An Amorphous Phase"; Ser. No. 09/016,850, filed on Jan. 30, 1998 and entitled "Silicate Coatings and Use Thereof", now U.S. Pat. No. 6,077,605, Ser. No. 09/532,982, filed on Mar. 22, 2000 and entitled "An Electrolytic Process For Forming a Mineral"; Ser. No. 09/535,319, filed on Mar. 22, 2000 and entitled "Corrosion Resisitant Lubricants, Greases and Gels"; and Ser. No. 09/016,462, filed on Jan. 30, 1998 and entitled "Aqueous Gel Composition and Use Thereof", now U.S. Pat. No. 6,033,495. The subject matter of these patents and patent applications is hereby incorporated by reference.

The subject matter herein claims benefit under 35 U.S.C. 119(e) of prior filed Provisional Patent Application Serial Nos. 60/129,060 and 60/151,995, filed respectively on Apr. 13, 1999 and Sep. 01, 1999 and entitled "Coating Compositions and Methods for Making and Using the Compositions". The disclosure of the previously identified patent applications is hereby incorporated by reference.

FIELD OF THE INVENTION

The subject matter of the instant invention relates to coating compositions containing at least one silica or borate containing compound, methods for making the compositions and methods of using the compounds for treating a metal surface.

BACKGROUND OF THE INVENTION

Electric motors and methods of manufacturing the same are well known. A core (also known as a rotor core) of the motor comprises stacked and coined together laminates. Each individual laminate defines a center opening for connecting a shaft and a series of evenly spaced openings around the periphery of the laminate. The openings can have any suitable configuration. The laminates are stacked and coined in a sequential and slightly offset fashion such that the openings around the periphery define a spiral channel passing along the longitudinal axis of the core/rotor. This channel passes along the longitudinal axis in a helix or spiral fashion that enhances the motor performance. The rotors cores are heat treated to form a surface comprising magnetite $Fe_3O4$. After heat treating, the channels are injected with molten aluminum thereby encapsulating the rotor within aluminum. The aluminum is typically injected at a temperature of about 1,300 to about 1,400 F. and at a pressure of about 4,000 to about 6,000 psi.

There is a problem in this art associated with injecting the aluminum within the channels. It is believed that the aluminum can solder to the steel and form an electrical connection between the laminates, e.g., as detailed in "A Description of the Functions and Process Tests For Cast Aluminum Induction Motor Squirrel Cage Rotors" by J. Johnson et al., presented as a paper at Rotor Technology '86, Feb. 5–7, 1986, the disclosure of which is hereby incorporated by reference. Such an electrical connection can cause a short within the electric motor thereby reducing, if not eliminating, the effectiveness of the electric motor. There is a need in this art for an electric motor fabrication method that isolates the aluminum from the laminates e.g., prevents the molten aluminum from infiltrating between the stacked/coined laminates (with or without a magnetite surface).

There is also a need in this art to improve electric motor manufacturing by employing the principals known as "lean manufacturing" in order to eliminate non-value added activities during the manufacturing process. Examples of non-value added activities are described in U.S. Pat. No. 5,161,597 (Dohoger) and U.S. Pat. No. 5,488,984 (Fahy), e.g., burn-off ovens, oxidation furnaces, hot drop, among other processing delays. By improving electric motor manufacturing and employing statistical process controls, the amount of work in progress can be reduced and "just in time" production methods can be adopted.

As described in U.S. Pat. No. 5,488,984, rotors of electric motors can be coated with sodium nitrate. Other conventional coatings compositions and methods for treating metals are disclosed in U.S. Pat. Nos. 4,870,814; 4,032,366; 5,182,963; 5,776,261; 3,839,256; 3,372,038; 2,641,556; 2,803,566; 5,723,181; 2,554,250; 1,068,410; 2,811,473; 2,282,163; 3,910,797; 3,832,204; 3,917,648; 2,978,361; 5,789,085; 3,796,608; 3,133,829; 2,385,332; 2,799,658; 2,641,556; 3,839,256; and 3,752,689.

Magnetic Silicon Steels produced for use as laminates either for rotor, stator or transformer application typically require an annealing separator comprising thin films of inorganic compounds such as magnesium oxide and phosphate as taught by J. Evans in U.S. Pat. No. 3,615,918 and Akerblom in U.S. Pat. No. 4,120,702 and Nakayama U.S. Pat. No. 4,875,947 and magnesium from U.S. Pat. No. 2,385,332 V. Carpenter, and Steger in U.S. Pat. No. 3,583,887, sodium silicate Lee in U.S. Pat. No. 3,945,862 teaches an amorphous magnesia silica complex and a boron bearing compound. Evans teaches an insulation coating for electrical steels in U.S. Pat. No. 3,996,073 comprising an aluminum magnesium phosphate solution with colloidal silica and chromic anhydride. Organic quaternary ammonium silicate coatings are taught by R. Parkinson, U.S. Pat. No. 3,839,256 and polyvinyl acetate with phosphoric acid and chromic acid is taught by Kitayama in U.S. Pat. No. 3,793,073. Additionally, Yamazaki, in U.S. Pat. No. 5,961,744 teaches colloidal silica and aluminum phosphate. Haselkom in U.S. Pat. No. 4,496,399 teaches silica and aluminum silicate dispersed in vinyl resins, while Morito in U.S. Pat. No. 4,255,205 teaches silicate aluminum oxide, strontium and barium compounds in phosphoric acid. B. Perfetti in U.S. Pat. No. 4,507,360 teaches magnesium silicate, mica, titanium oxide and alkali metal borate. Perfetti also teaches in U.S. Pat. No. 4,517,325 the use of organic quaternary ammonium silicate and ethylene/acrylic or ethylene/vinyl/acetate copolymer a small amount of barium, strontium or lead chromate. Katayarna in U.S. Pat. No. 4,844,753 teaches acrylic and a acrylic styrene resins with chromates. Nakamura in U.S. Pat. No. 4,618,377 also teaches emulsions. U.S. Pat. No. 1,951,039 by Scharschu, teaches sodium silicate, lime and iron oxide. D. Loudermilk teaches inorganic/organic insulating films in U.S. Pat. No. 5,955,201 utilizing aluminum silicate, aluminum potassium silicate and magnesium silicate dispersed in a water-soluble, organic solvent, resin. Also acrylic resin with chromates are taught by K. Kenichi in U.S. Pat. No. 4,844,753. Also Robinson teaches a paint in U.S. Pat. No. 2,641,556 comprising refractory material suspended in a solution of a decomposable binder such as a solution of an alkyd resin, cellular acetate in organic solvents. U.S. Pat. No. 5,922,413 by Takeda, teaches a method of coating a rotor core by applying a liquid primer followed by applying a powder coat. The disclosure of the previously identified U.S. Patents and publications is hereby incorporated by reference.

SUMMARY OF THE INVENTION

The present invention relates to coating compositions and methods for using such compositions. The present invention solves problems associated with conventional electric motor manufacturing practices by providing inorganic and/or organic coating compositions applied to rotor cores to eliminate soldering during aluminum injection. These coatings can be applied upon rotor and/or stators laminates to enhance motor performance. These coatings can also be employed in transformers and other electronic components. The instant invention further solves problems associated with conventional electric motor fabrication methods by providing at least one film or layer of a coating composition within channels or bar slots defined by the rotor of the electric motor core/rotor (depending upon the design of the motor the slots can be defined within the rotor or open ended along the longitudinal axis of the rotor). The inventive coating composition is also typically applied upon all exposed surfaces of the rotor, e.g., within the channels and exterior surfaces of the rotor. The coated rotor is then contacted with a molten metal. The coating composition functions to isolate the laminates (e.g., steel) of the rotor from a molten metal (e.g., aluminum and its alloys), which surrounds the rotor and fills the channels thereby embedding the rotor, and prevents the metal from forming an undesirable conductive path typically termed soldering among the individual laminates.

In one aspect of the invention, the coating composition interacts or reacts with a molten aluminum phase, i.e., the molten aluminum that is injected into and around the rotor. That is, the molten aluminum can react in situ with at least a portion of the inventive coating to form a mixed oxide. By reacting with the molten aluminum, the inventive coating prevents the aluminum from adversely affecting (or contacting) an underlying metal containing surface. The mixed oxide or reaction product can also function as a barrier or shield to the underlying metal containing surface, e.g., silicon steel laminates.

The instant coating composition functions to not only isolate the channels from corrosion and/or corrosion erosion caused when the aluminum is injected into the channels and serves as a heat shield but also reacts with molten aluminum and other phases present during injection. In some cases, the coating can interact with the molten aluminum to form a layer having a distinct composition, e.g., a glassy or an amorphous layer. The layer can be comprised of at least one of silicate or at least one borate containing compounds, a complex oxide, complex iron-sodium silicates, aluminum potassium silicates, aluminum/silicate Al/Si, mixtures thereof, among other materials including clays (e.g., bentonite, montmorillinate, talc, etc). This layer can also function as an electrical insulator between the steel of the core/rotor laminates and the adjacent aluminum. By "electrical insulator" it is meant that the layer has an electrical resistance of greater than about 1.0 milli-ohm (or a conductivity of less than about 1.0 milli-ohm). By "adjacent" as used in this specification and the claims, unless expressly stated otherwise, means two components or layers that are in contact with each other, are next to each other with a space separating them, or are next to each other with a third component or layer in between.

In another aspect of the invention, the coating composition further comprises iron nano-particles. The nano-particle containing composition, e.g., within a carrier comprising a water soluble polymer, can be incorporated within any suitable porous article. Examples of such porous articles comprise electronic components, magnets, shaped powdered metals, among other articles. If desired, the porous article (after being impregnated) can be heated.

The coating composition can also impart corrosion resistance to the surfaces of the rotor, e.g., the exterior surface of the rotor. That is, the coating composition reduces, if not eliminates, rotor corrosion that can occur prior to being contacted with aluminum.

DETAILED DESCRIPTION

Figure 1:
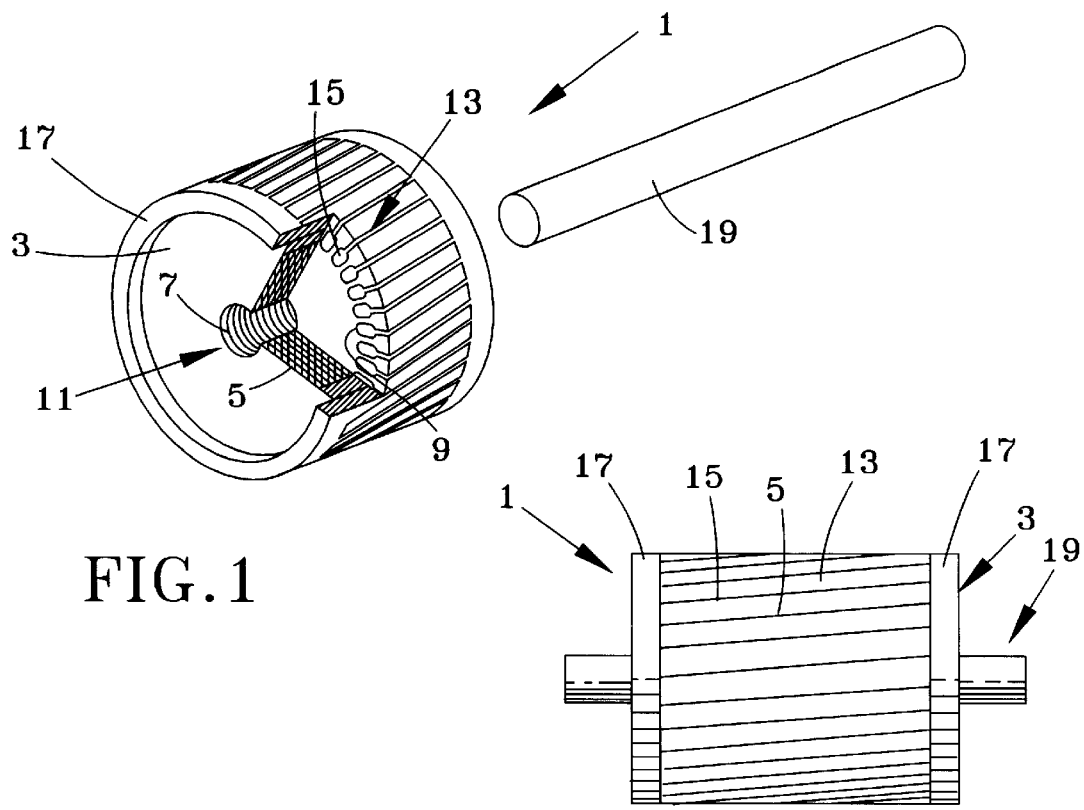
FIG. 1 is a perspective view of a rotor body for an electric motor that illustrates the individual laminations and the slots defined therein.

The instant invention relates to applying one or more films or layers of coating compositions onto a metal containing surface for improving the surface characteristics of the metal surface. By "metal containing surface" it is meant to include a wide range of metal surfaces such as steel, silicon-containing steel, iron and iron alloys, iron, high purity iron, zinc, copper, lead, metallized ceramics and plastics, among other metals and alloys thereof. The metal containing surface also includes naturally occurring or man made oxidation and reduction products, e.g., $Fe_3O_4$, $Fe_2O_3$, among others. The metal surface contacted with the inventive composition can in turn also be contacted with a wide range of metals including aluminum, brass, copper, lead, alloys thereof, among other metals. In the case of an electric motor, the metal containing surface can comprise spiral channels defined about or within a core or rotor and/or individual laminates. The core normally comprises coined and stacked steel laminates.

The coating composition can comprise at least one silica or silicate containing material or precursors thereof. The terms silica and silicate containing materials are used interchangeable herein. Examples of such silica containing materials comprise at least one member chosen from the group of silica, boro-silicates, magnesium silicate, calcium silicate, potassium silicate, sodium silicate, magnesium silicate, tetra-ethyl, tetra-methyl orthosilicate, silicones, kaolin, Al—Na ($SiO_2$) complex oxides, sodium aluminate, silanes, partially hydrolyzed ethyl ortho silicate and its reaction products formed with quaternary ammonium compounds (e.g., cetyltrimethyl ammonium bromide in ethyl alchol), iron silicate, tetra alkyl ammonium salts of silica acids, precursors thereof, among others. Silicate containing materials also include TEOS, TMOS, among others. Silica containing material also includes colloidal silica that is optionally stabilized with sodium aluminate, ammonium, alumina coated, contains ethyl glycol, among other stabilizations and treatments (these materials are supplied in aqueous solutions commercially as Ludox®). Normally, the amount of silica containing material will comprise about 5 to about 50 wt. % of the composition. When the silica containing material comprises a silicate such as sodium silicate, the composition will have a basic pH; normally about 9 to about 11.5.

Instead of or in addition to the at least one silica containing material or precursors thereof, the coating composition can comprise at least one borate containing material or precursors thereof. Examples of such borate containing materials comprise at least one member chosen from the group of boric acid, boro-silicates, metaboric acid, boron oxide, ammonium tetraborate, ammonium pentaborate, ammonium peroxyborate, beryllium ortho borate, orthoboric acid, tetraboric acid, boron phosphide, boron selenide, boron trisilicide, boron hexasilicide, boron trisulfide, boron pentasulfide, lead borate, zinc borate, magnesium borate, cesium borate, rubidium borate, precursors thereof, among others. Borate containing materials can further comprise at least member chosen from the group of aluminum oxide, zirconium silicate, magnesium silicate, kaolin, potassium silicate, sodium silicate, calcium silicate, sodium aluminate, bentonite, among others. Normally, the amount of borate containing material will comprise about 10 to about 25 wt. % of the composition.

The silica and/or borate containing material can also include compounds that provide enhanced protection to the rotor core from the injected metal, e.g., electrically insulate the core from the injected metal. Examples of such compounds can comprise at least one member selected from the group consisting of wollastonite, bentonite, hectorite (both forms of smeitite), calcium sulfate (Plaster of Paris), among other inorganic compounds or organic precursors to such compounds.

The silica and/or borate containing compositions can be employed with or without metals such ag zinc described in the aforementioned U.S. Patents. The silica and/or borate containing material(s) can be dispersed within either an aqueous or a solvent-containing carrier. Examples of a suitable carrier can comprise at least one member selected from the group consisting of methanol, ethanol, isopropanol, water compatible polymers such as urethanes, acrylics, etc., among other carriers compatible with the silica and/or borate containing material. Normally, the amount of carrier comprises about 5 to about 20 wt. % of the coating composition.

In one aspect of the invention, one coating composition can further comprise at least one member selected from the group consisting of sodium aluminate, sodium clays, bentonite kaolin, peroxide or oxygen releasing compounds, molecular sieves, ammonium hydroxide, amines, ammonium zirconyl carbonate, intumesent materials, among others.

The metal containing surface to be treated with the inventive composition(s) can be pre-treated or cleaned in accordance with conventional methods. Such methods are employed for removing oils and debris that could interfere with application of the coating composition. An example of a pre-treatment comprises hydrogen peroxide and one of the aforementioned solvents or hot alkali cleaning to a water break rinse. The metal surface can also be pre-treated in accordance with conventional methods such as phosphating, chromating, among other metal treatment processes. In accordance with the inventive method, a phospated surface is preferably contacted with a borate containing material.

The inventive composition can be applied onto the metal to be treated by any suitable method. Examples of such methods comprise spraying, dipping, immersing, rolling, brushing, electrostatic including powder coatings, fluidized bed coating systems, chemical vapor depositions, physical vapor deposition, among other methods. When the metal comprises a core of an electric motor, the best results are obtained by rolling the core in a direction parallel to its longitudinal axis within a reservoir of the inventive coating composition. The core is rolled such that the composition infiltrates the aforementioned channels. Depending upon the electric motor, the entire core or selected portions thereof can be coated with the inventive composition. If desired, applying an electrical current and/or a vacuum pump can enhance the application method. Normally, the coating composition will form an approximately 1 to 10 mil thick film upon the interior of the channels of the core and the O.D.

The coating composition can comprise more than one coating having similar or distinct chemistry. As a result, the coating can be tailored to the environment created by the injected molten metal reacts with the silica and/or borate containing coating in order to provide the desired insulation between the metal and core as well as filling the notches created by the laminate spiral. If desired a secondary coating can be applied upon the silica and/or borate containing coating. Such secondary coatings can be employed as a heat shield, oxygen shield, reactive, sacrificial, intumescent, chemical resistant, erosion resistant, among other desirable properties. In the case of an intumescent coating, depending upon the coating composition a temperature of about 250 F. to 1325 F. is sufficient to cause the coating to expand. In the case of a metal surface comprising an electric motor rotor, a first coating comprising at least one silica containing material such as TEOS, TMOS, sodium silicate, potassium silicate, among others, or at least one borate containing material such as borax, boric acid, bentonite, among others is applied upon a motor rotor and a secondary coating comprising at least one of silica, sodium silicate and optionally a surfactant and water soluble polymer are applied upon the first coating. The coatings can be pre-reacted (prior to aluminum injection) by exposure to a heat source.

In an aspect of the invention, the infiltrated coating is converted into an oxide-containing surface. The infiltrated coating can then be converted, e.g, into an amorphous material or oxide, at any suitable temperature, e.g., about 200 to 500 C in one or two stages as described in U.S. Pat. No. 5,510,188 (hereby incorporated by reference). If desired, the conversion can be performed in a controlled atmosphere such as hydrogen, high humidity, carbon dioxide, ammonia, nitrogen, oxygen, among others. The conversion with or without a controlled atmosphere can be enhanced by adding heat, e.g., with infrared, microwave, electrical resistance, among other known heating methods.

In one aspect of the invention, the individual laminates are contacted with the coating composition. The coated laminates can then be stacked and coined together in order to form a core. The resultant core can then be processed to form an electric motor in accordance with conventional methods.

In another aspect of the invention, the coating within the channels is contacted with at least one insolubilizing agent. While any suitable insolubilizing agent can be employed examples comprise at least one member chosen from the group of phosphoric acid, hydrofluoric acid, sulfuric acid, nitric acid, alkaline earth metal oxides and hydroxides, salts of amphoteric metals, among others including those described in U.S. Pat. No. 3,301,701 (hereby incorporated by reference). The insolubilizing agent can react with the coating, i.e., a silica containing coating, thereby forming an insoluble amorphous coating.

In a further aspect of the invention, the metal surface (including channels) are contacted with a conventional phosphating pre-treatment. The phosphated metal surface is contacted with a first silica or borate containing composition, e.g., comprising sodium silicate and/or tetraorthosilicate (optionally containing zinc), that in turn is contacted with a second silica or borate containing composition. The first composition can comprise a silica containing composition comprising a 50/50 wt. % combination of silica and at least one silicate, e.g., sodium silicate. The second silica containing composition can comprise a commercially available silica such as Ludox®, an aqueous dispersion such as disclosed in U.S. patent application Ser. No. 09/016,462 (U.S. Pat. No. 6,033,495), among others. The second composition normally contains a greater concentration of silica than the first composition. Without wishing to be bound by any theory or explanation, the second composition is directly contacted by the metal that is injected into the stacked laminates (rotor) wherein the second composition can react with the molten metal. That is, the coating functions as an intumescent swelling sacrificial layer that electrically segregates the injected metal (when molten and solidified) from the metal of the rotor core. The swelling sacrificial layer may be converted, e.g., reduced, by the molten metal and form an amorphous phase. The coating can also function to fill gaps or voids among the stacked laminates thereby preventing the molten metal from infiltrating into the gaps.

The thermal properties of the inventive composition can be improved by adding at least one member selected from the group consisting of boron nitride, aluminum nitride, silicon carbide, silicon nitride, carbon, boron oxide, mixtures and organic precursors thereof. The amount of thermal additive normally comprises about 5 to about 50 wt. % of the composition.

The magnetic properties of the inventive composition (and substrates treated with the composition) can be modified by adding ferromagnetic material, e.g., ranging from micron to nano sized particles. Such material may enhance the magnetic field or reduce eddy current loss in electronic components such as laminates, transformer and electric motor stacks. Iron nanoparticles typically range in size from about 4 to about 5 nanometers as described in greater detail in U.S. Pat. No. 6,045,925 (Kiabunde); hereby incorporated by reference. Iron nanoparticles can be heat treated to form agglomerates of about 20 nanometers. Larger particles comprising strontium hexaferrite range in size from about 1.2 to about 1.8 micron. Iron nanoparticles can be coated to prevent corrosion of the particles. Normally, iron nanoparticles are a few mircons in size, contain less than about 2.0 wt. % carbon (usually less than about 0.9 wt. % carbon), and a length to width ratio of about 3:1 to about 20:1. The characteristics of iron nanoparticles are described in greater detail in U.S. Pat. Nos. 5,213,816; 5,397,530; 5,268,140; 5,063,01 1; 4,601,765; 4,947,065; "Nanoscale Magnetic Particles" by Easom et al., Polyhedron, Vol, 13, No. 8, pp. 1197–1223, 1994; "Encapsulated Nanoparticles of Iron Metal" by Klablunde et al., Chemistry of Materials, 1994, 6; and "Nanoscale Iron Crystallites Encapsulated in Nonmagnetic Metal Shells" by Zhang et al., High Temperature and Materials Science, Vol. 36, 1996; hereby incorporated by reference. Without wishing to be bound by any theory or explanation, it is believed that iron nanoparticles are more electomagnetically responsive than plain steel or silicon steel, and when combined with iron nanoparticles improved magnetic properties at cold temperature the addition of a thin film containing iron nanoparticle on a stator, slot and/or rotor may enhance motor performance by reducing eddy currents. Iron nanoparticles are available from Nantek, Manhattan, Kan., Magnetics International, Chicago, Ill., Kane Magnetics, Kane Pa., and Kanto Kenka Kogyo (Grade Mapex 2000). In most cases, it is desirable to coat the nanoparticles in order to prevent corrosion or rapid oxidization. Typically, the nanoparticles are coated with carbon, corrosion resistant metals, water insoluble resins, among other protective coatings. Normally, the amount of nanoparticles will comprise about 5 to about 50 wt. % of the coating composition The inventive composition can be prepared in accordance with conventional mixing methods. If desired, a wide range of additives can be included in the inventive composition such as one or more members selected from the group consisting of viscosity control agents (e.g., aliphatic polymer with carboxylic acid groups, e.g., CARBOPOL supplied by B.F. Goodrich, xantham gum, silica, synthetic minerals, e.g., LAPONITE supplied by Southern Clay Products), pH modifiers (e.g., an alkaline material such as at least one member selected from the group consisting of sodium hydroxide, potassium hydroxide, triethanolamine, ammonium hydroxide), dyes, surfactants, solvents, among other materials. The amount of additive normally comprises about 1 to about 20 wt. % of the coating composition.

Figure 2:
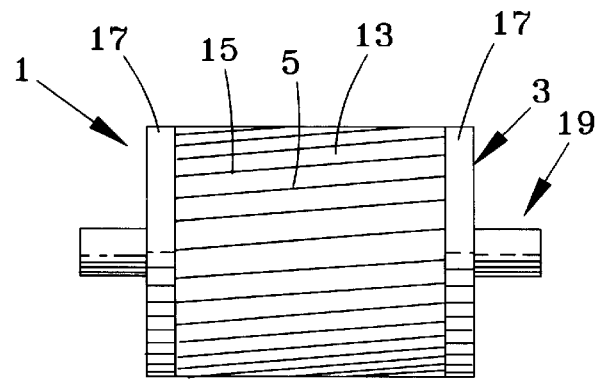
FIG. 2 is a side elevation of FIG. 1 of a rotor assembly after having a rotor shaft fitted into the bore of the rotor.
Figure 3:
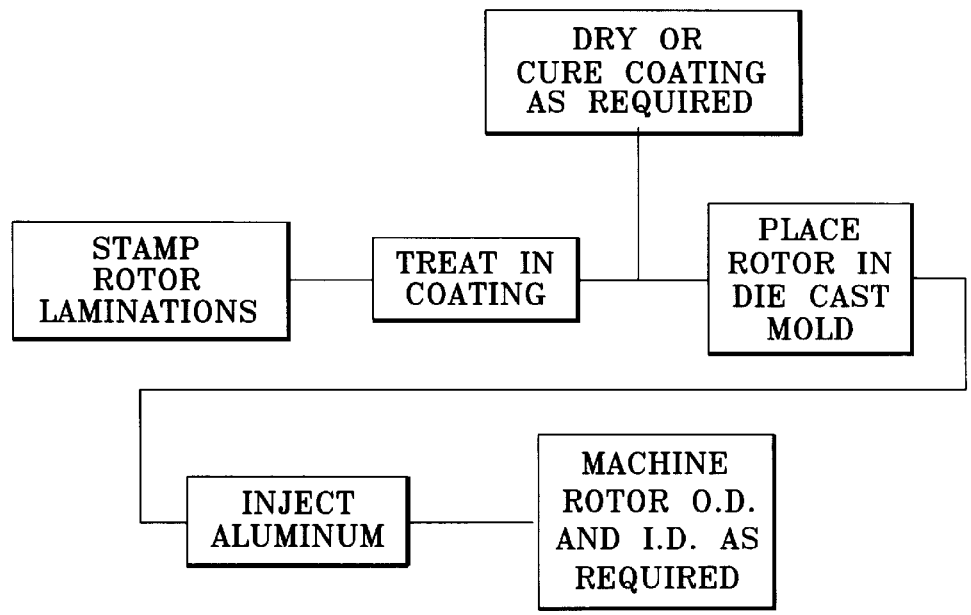
FIG. 3 is a flow chart of the principal steps in one aspect of the invention for forming an electric motor in accordance with the instant invention.

Certain aspects of the instant method are better understood by reference to the drawings. Referring now to the FIGS. 1 and 2, a rotor body, as indicated in its entirety by reference character 1, comprises a core 3 comprising a stack of substantially identical laminations 5 which are preferably made of thin, plate-like ferro-magnetic material, such as a high magnetic permeability sheet steel, e.g., siliconized steel. As is conventional, laminations 5 are die punched from sheet steel and have a central opening 7 therethrough (conventional die punching processes can introduce defects, e.g., edge defects, caused when metal is sheared during the punching process). A plurality of substantially identical generally radial notches 9 in their outer margins with the notches are spaced at equal angular intervals about the lamination. Upon assembly of the stack of laminations to form the core, the laminations are coaxially arranged so that their central openings 7 form a bore 11 extending longitudinally through the core and which are wrapped slightly around the longitudinal axis of the core in helical fashion. As illustrated in FIG. 3, the laminations constituting core 3 are typically secured together in stacked relation under a desired compressive loading by any one of several known means, and the injected aluminum holds the core in desired arrangement after manufacturing. The rotor assembly illustrated is a squirrel-cage rotor and, as is typical, has a plurality of die cast-in-place rotor bars 15 formed within slots 13 and further has die cast end rings 17 formed on the end faces of core 3 unitary with and interconnecting the rotor bars. Typically, core 3 is placed within a die-casting mold (not shown) as stacked pretreated loose laminations. Molten aluminum is injected under pressure of a piston, or the like, into the mold, the molten aluminum flows into slots 13 to form bars 15, filling the mold cavity to create end rings 17. After die casting, the core assembly, as illustrated in FIG. 1, may be ground or lathed so as to form a uniform and even outer cylindrical surface concentric with the axis of bore 11.

Bore 11 in core 3 is sized and formed as to be shrunk or otherwise fitted on a rotor shaft 19. That is, the inside diameter of bore 11 is slightly smaller at ambient temperature than the outside diameter of shaft 19 so that upon heating of core 3 to a predetermined elevated temperature, the inside diameter of bore 11 will expand or increase to a size sufficient to receive shaft 19 there within. Upon cooling of the core, the latter will contract around the shaft and will securely lock it in place therein thus fixing the core to the shaft. Other interconnecting methods are known in the art and all are compatible with the broader aspects of the invention.

In accordance with one aspect of the invention, the laminations 5, prior to being placed in the mold, are treated with at least one coating of the inventive composition in order to prevent the molten aluminum, which is being injected through and around the stacked laminations 5, from soldering to the laminations. While any suitable method can be employed, for best results individual or coined/stacked laminations are introduced into an immersion tank. Normally, stacked laminations are contacted with the inventive composition in order to more effectively treat any voids among the laminations.

If desired, the immersion tank solution can be warmed, e.g., between 75 C. and less than the boiling point of water. The laminations can also be agitated in the inventive composition in order to enhance coating efficiency. The laminations are then removed from the solution and allowed to dry under ambient conditions or in a heated environment.

While the above description places particular emphasis upon coating an electrical motor core, the instant invention can be employed for treating a virtually unlimited array of surfaces including electronic components such as stators, transformers, among others. Such treatment can impart improved surface properties such as electrical resistance, magnetic (e.g., an iron nano-particle containing coating), corrosion resistance, adhesion/release, anti-static, among other characteristics. The following Examples are provided to illustrate certain aspects of the invention and do not limit the scope of the invention as defined in the appended claims.

EXAMPLES

The following Examples 1–4 illustrate preparing a solution that can be employed for coating an electrical motor rotor. The coating imparts improved corrosion and erosion resistance when being infiltrated with molten metals such as aluminum.

Example 1

42 grams of M grade sodium silicate solution (PQ Corp.) were dilute with distilled water to 84 grams. Slowly stir in 2 grams of Cabosil M-5 fumed silica (Cabot Corp.) and stir with a glass stirring rod for 15 minutes. Add 9 grams Ludox AM-30 Colloidal Suspension (Aldrich Chemical Co.) slowly while stirring with a glass stirring rod. Finally add 5.0 grams of sodium aluminate (5 wt % in water) solution slowly and stir for 15 minutes. A uniform aqueous coating solution was obtained.

Example 2

The coating solution of Example 1 is applied to a steel substrate and dried at 85° C. for 15 minutes to obtain a dry coating layer. The coating layer is further modified by treating it with a 10 wt % solution of Bacote 20 (Magnesium Electron) which contains ammonium zirconyl carbonate.

Example 3

A solvent borne coating solution was prepared by mixing 73 grams tetra-ethyl orthosilicate (Aldrich Chemical Company) with 20 grams of reagent alcohol (Fisher Scientific) and mixing lightly with a stirring rod. Slowly stir in 2 grams of Cabosil TS-720 fumed silica (Cabot Corp.) and stir with a glass stirring rod for 15 minutes. Add 5 grams Zeolex 23-A (J.M. Huber Corp.) sodium aluminosilicate and stir with a glass stirring rod for 10 minutes. A uniform aqueous coating solution was obtained.

Example 4

The composition of Example 3 is modified by replacing the Zeolex 23-A with Kaolin Powder (J.T. Baker) and addition of 5 grams of an organo amine such as methyl morpholine which functions as a coatings stabilizer and fixation agent. Additionally, the organoamine can be dispersed in reagent alcohol (e.g. 10% by volume) and used as a secondary treatment of films produced by drying the substrates coated with compositions Examples 3 or 4 at 85° C. for 15 minutes.

Example 5

A solvent borne composition having the following composition was prepared.

| COMPONENT/SUPPLIER | WT % |
|---|---|
| Xylene | 15.7% |
| IPA (Fisher Histological Grade) Lot #966282-36 | 35.2% |
| Fumed Silica Cabosil TS-720 | 9.3% |
| Molecular Sieves 3A Union Carbide | 0.9% |
| UCAR ESPE Union Carbide Lot #S-086599 RCVD 6/21/90 | 38.9% |
|  | 100% |

The composition described in the above Table (50 g.) was combined with 5 g. of sodium silicate powder, and applied onto a 1∴4inch steel panel. The panel was dried in an oven at 78°–80° C. for 5 minutes had powdery material on surface.

Example 6

The coating systems listed in the following Table were prepared by mixing by hand and applied onto a commercially available rotor core (comprising staked laminates).

| RUN # | SAMPLE # | NAPHTHA CLEANING | Biodegradable CLEANING | SURFACE Activator | Coating System | X-LINKER |
|---|---|---|---|---|---|---|
| 1 | 12-1 | Yes | No | no | WB A | no |
| 2 | 12-2 | Yes | No | yes | WB A | no |
| 3 | 12-3 | No | Yes | no | WB A | no |
| 4 | 12-4 | No | Yes | yes | WB A | no |
| 5 | 13-1 | Yes | No | no | WB B | no |
| 6 | 13-2 | Yes | No | yes | WB B | no |
| 7 | 13-3 | No | Yes | no | WB B | no |
| 8 | 13-4 | No | Yes | yes | WB B | no |
| 9 | 14-1 | Yes | No | no | SB A | no |
| 10 | 14-2 | Yes | no | yes | SB A | no |
| 11 | 14-3 | No | yes | no | SB A | no |
| 12 | 14-4 | No | yes | yes | SB A | no |
| 13 | 15-1 | Yes | no | no | SB B | no |
| 14 | 15-2 | Yes | no | yes | SB B | no |
| 15 | 15-3 | No | yes | no | SB B | no |
| 16 | 15-4 | No | yes | yes | SB B | no |
| 17 | 12-5 | Yes | no | no | WB A | Yes |
| 18 | 12-6 | Yes | no | yes | WB A | Yes |
| 19 | 12-7 | No | yes | no | WB A | Yes |
| 20 | 12-8 | No | yes | yes | WB A | Yes |
| 21 | 13-5 | Yes | no | no | WB B | Yes |
| 22 | 13-6 | Yes | no | yes | WB B | Yes |
| 23 | 13-7 | No | yes | no | WB B | Yes |
| 24 | 13-8 | No | yes | yes | WB B | Yes |
| 25 | 14-5 | Yes | no | no | SB A | Yes |
| 26 | 14-6 | Yes | no | yes | SB A | Yes |
| 27 | 14-7 | No | yes | no | SB A | Yes |
| 28 | 14-8 | No | yes | yes | SB A | Yes |
| 29 | 15-5 | Yes | no | no | SB B | Yes |
| 30 | 15-6 | Yes | no | yes | SB B | Yes |

-continued

| RUN # | SAM-PLE # | NAPH-THA CLEAN-ING | Biode-gradable CLEAN-ING | SUR-FACE Activator | Coating System | X-LINKER |
|---|---|---|---|---|---|---|
| 31 | 15-7 | No | yes | no | SB B | Yes |
| 32 | 15-8 | No | yes | yes | SB B | Yes |

Biodegradable Cleaner = Methyl Soyate rinse followed by d-Limonene rinse
Surface Activator = Hydrogen Peroxide (20 wt. % of 50% initial solution = 10 wt % total in water)

| Coating System | COATING DESCRIPTION | CROSSLINKER | X-LINKER Method |
|---|---|---|---|
| WB-A | NaSi—N/Ludox/Na Alum./Silica | Ammonium Zirconyl Carbonate | 2nd Coat |
| WB-B | Ludox AM 30 | Ammonium Zirconyl Carbonate | 2nd Coat |
| SB-A | TEOS/Silica/Molecular Seives | Methyl Morpholine in Rea. Alc. | 2nd Coat |
| SB-B | TEOS/Silica/Kaolin | Methyl Morpholine | Addition |

Ammonium Zirconyl Carbonate = 20 wt. % solution of Bacote 20 (Magnesium Elektron Inc.) in water Ammonium Zirconyl Carbonate=20 wt. % solution of Bacote 20 (Magnesium Elektron Inc.) in water Example 7

A coating composition comprising 4.75 g of LUDOX AM30, colloidal silica, sodium aluminate stabilized, was mixed with 0.13 g of Baghouse Fines (Sodium Silicate). The coating was applied onto a steel panel.

Example 8

A coating composition comprising 4.75 g of LUDOX AM30, colloidal silica, sodium aluminate stabilized, was mixed with 0.138 of CABOSIL M5—fumed silica. The coating was applied onto a steel panel.

Aluminum was melted in a muffle furnace at 1370° F. and poured from crucibles onto the coated steel panels of Examples 7 and 8. After cooling to room temperature, the panels were visually inspected. Visual inspection revealed that there was substantially no adhesion between the aluminum and the steel panels.

Example 9–13

The coating compositions of Example 6 were applied per the Table of Example 6 onto a commercially available rotor from an electric motor company, and processed through by injecting molten aluminum into and around the rotor in accordance with commercial die process. Best results were obtained from Sample 15-1 that produced a bar-to bar (metal filled rotor channel) electrical resistance of greater than 1.0 milli-ohm.

Example 14

A solution comprising 50/50 wt. %, sodium silicate (N-Grade, PQ Corp.), and aqueous colloidal silica treated with sodium aluminate stabilizer (Ludox® AM-30, DuPont Company), was mixed together by hand with glass stir rod for 15 minutes. A second solution comprising Ludox® AM-30 and organometallic surfactant (NZ38J, Kenrich Petrochemical), were mixed together by hand with glass stir rod for 15 minutes. Two 2"×5" and one 2×4 cold roll steel strips were cleaned with reagent alcohol and air dried. The panels were dipped into the 50/50 solution and placed in oven at 60° C. for 15 minutes. After taken out and cooled the strips were dipped in the second solution (Ludox® AM-30 and 38J) and dried 15 minutes at 60° C.

Aluminum alloy (Alcanal 801737) was melted in a melt pot of about 1500°. The three strips were dipped into the molten aluminum. By visual inspection, the coating upon the strips survived exposure to molten aluminum.

Example 15

ACT 1×4×0.032 cold rolled steel test panels were cleaned with reagent alcohol. Four panels were dipped in a 50/50 wt. % mixture comprising sodium silicate (N Grade, PQ) and a silica suspension comprising (Ludox® AM-30), and dried in oven at 60° C. for minutes and then dipped in a mixture comprising Ludox AM-30 and an organometallic surfactant (38J, Kenrich Petrochemicals), and dried 15 minutes at 60° C.

Four 2×5 panels additional panels were prepared as above but were coated with a mixture comprising potassium silicate and Ludox AM-30 (instead of N Grade and Ludox AM-30), and oven dried at 60 C. for 15 minutes. All of the panels were coated to a 0.008 thickness. Two of the 1×6× 0.032 and 3 2×5 were placed in furnace at 260° C. for 10 minutes.

The electrical conductivity of the dried panel surface was checked by using a Franklin Tester in accordance with conventional practice. The coated surface of the panels was an electrical insulator.

Two of the coated 2×5 were placed in furnace for 4 minutes 1325° F. Visual inspection of these panels indicated that the coated had intumesced.

Example 16

A borate containing coating composition was prepared by using the following formulation:
1.3 g boric acid
19.7 g sodium tetraborate (Borax)
79.0 g de-ionized (D.I.) Water The D.I water was heated to 79° C. The boric acid was added and then the sodium tetraborate. The solution was kept on a Fisher scientific hot plate and stirred until the ingredients were dissolved. The solution took 45 minutes to dissolve. An extra 20 grams of D.I. water was added after 20 minutes.

One commercial electric motor laminate was cleaned with reagent alcohol and dipped into the borate containing solution. The laminate was oven dried at 65° C. for 10 minutes. Using the same solution a drop of an organometallic surfactant (38J, Kenrich Petrochemical), was added. A laminate was cleaned and dipped into solution, and oven dried at 65° C. for 10 minutes. Visual inspection of the dried laminates indicated that the surfactant enhanced wetting of the borate containing solution.

Example 17

A borate containing coating composition have the following formulation was prepared:
7.5 grms boric acid
100.0 grms borax (sodium tetraborate)

400.0 gram de-ionized (D.I.) water
20 drops of 38J (organornetallic surfactant).

D.I. water was heated to 79° C. Boric acid and borax were added to the heated D.I. water while stirring occasionally for 45 minutes until dissolved. 38J was added to solution. Three 2×5 panels and four ACT 1×4×0.032 coupons were cleaned with reagent alcohol and allow to air dry. The panels were dipped in heated borate containing solution and dried in oven at 60° C. for 10 minutes.

The previously described conductivity test indicated that random isolated areas of the surface were electrically conductive. The coated panels were contacted with a second coating. After heating the panels having a second coating at 60° C. for 10 minutes the panels were non-conductive.

Two commercially available electric motor rotors (comprising stacked laminates) were dipped into the borate containing solution and oven dried. One was cleaned with reagent alcohol. The other dipped without cleaning. The rotor not cleaned was conductive on flat surfaces and edges. The rotor cleaned was non-conductive on face surfaces, and conductive on edges.

If desired the above formula can be modified by adding 10–20 wt. % bentonite. The addition of bentonite increases the viscosity of the formula thereby permitting application of a relatively thick film.

Example 18

The following examples was performed to ascertain the miscibility of aqueous colloidal silica in borate containing composition. Using 20 ml of a borate formulation (comprising 7.5 grams boric acid, 100.0 grams borax and 400 gram de-ionized water), the six commercially available colloidal silica products (Ludox®) listed below were mixed at 1 and 5 weight percent to ascertain miscibility. The commercially available Ludox® products listed below were tested:
Ludox® AM-30
Ludox® L5
Ludox® A5-30
Ludox® CL
Ludox® TMA
Ludox® SM-30

The formula was heated to a temperature of about 79° C. when the aqueous colloidal silica was added. Each of the mixtures formed a thin film when applied onto steel test panel and had a grainy texture after drying under ambient conditions 15 to 20 minutes.

Example 19

This example demonstrates mixing bentonite with a borate containing composition comprising 400 ml de-ionized water, 7.5 grams boric acid, 100 grams borax and 20 drops of an organometallic surfactant (Kenreact NZ38J). Using 200 ml of the borate containing formula, bentonite as indicated below in order to increase the viscosity of the borate containing solution:
1) 10.5 grams of bentonite was added to 200 ml of the borate containing formula to make a 5% solution.
2) 22.2 grams of bentonite was added to 200 ml of the borate containing formula to make a 10% solution.
3) 35.3 grams of bentonite was added to 200 ml of the borate containing formula to make a 15% solution.

The bentonite and borate containing solution were combined at a temperature of 79 C.

Three commercial rotors were brushed and cleaned with reagent alcohol before dipping into the bentonite/borate containing solutions. The 15 percent bentonite solution provided the greatest increase in viscosity. The rotors were dipped and dried in oven for 30 minutes.

A secondary coating was applied by dipping one end of the coated rotors into a solution comprising aqueous colloidal silica (Ludox® AM-30) and an organometallic surfactant (38J), and dried at 60° C. for 10 minutes.

Example 20

Using the rotors previously end-coated in accordance with Example 19, the opposite end was dipped in a 50/50 wt. % composition comprising sodium silicate (N-grade) and aqueous colloidal silica (Ludox® AM-30) in order to form an intumescent and non-conductive coating within the rotor slots. The rotors were dipped and dried at 110° C. for 20 minutes. The rotor were then placed in a furnace oven at 1325° F. for 4 minutes and removed.

The conductivity of the flat surfaces and slots of the coated rotors was tested by using a Franklin Tester. The intumescent coating was electrically insulative or non-conductive on the face and edges.

Example 21

A 50/50 wt. % silica containing composition comprising sodium silicate (N Grade) and colloidal silica (Ludox® AM30) was mixed together by using an electric mixer. Eleven (11) ACT cold roll steel coupon, 1×4×0.032 were cleaned with naphtha and reagent alcohol using a Wimwipe to wipe off access and allowed to air dry before dip.

Using only sodium silicate, 3 panels were dipped and dried at 60° C. for 10 minutes. No intumescent coating was formed. The panels were then placed into a 110° C. oven for 10 minutes. No intumescent coating was formed.

The 50/50 wt. % silica containing coating was applied upon the coupons, and heated by being placed in a furnace oven of 1325° F. for 4 minutes. An intumescent coating was formed.

Example 21

This Example demonstrates using a water soluble polymer comprising an acrylic emulsion in a silica containing solution comprising sodium silicate (N-grade), an aqueous colloidal silica (Ludox® AM) and an organometallic surfactant (NZ38J). Four ACT cold roll steel panels were contacted with the following coating compositions:
A. 1 panel was contacted with unmodified acrylic emulsion,
B. 2 panels were coated with the silica containing solution having 5 wt. % acrylic emulsion,
C. 1 panel was coated with the silica containing solution having about 50 wt % acrylic emulsion.

After being contacted with an acrylic emulsion coating, the coupons were dried at 60° C., 110 C. and 290 C. Visual inspection of the coupons indicated that each of the coating compositions was adhered to the coupon. If desired, the coupons can be coated with a borate containing coating, e.g., comprising de-ionized water, boric acid, borax and an organometallic surfactant, and contacted with a secondary coating comprising the coating the instant Example.

Example 23

This example illustrates an acrylic emulsion comprising 50/50 wt. % sodium silicate (N-grade) and an aqueous colloidal silicate (Ludox(D A-M30) with an organometallic sufactant (Ken-React N2 38J). Acrylic emulsions having the following compositions were prepared:

| 5%            | 10%           | 15%           | 20%          | 25%          |
|---------------|---------------|---------------|--------------|--------------|
| 20 ml 50/50   | 20 ml 50/50   | 20 ml 50/50   | 20 ml 50/50  | 15 ml 50/50  |
| 1.0 g acrylic | 2.2 g acrylic | 3.5 g acrylic | 5 g Acrylic  | 5 g Acrylic  |

5 cold roll steel coupons were cleaned with naphtha and reagent alcohol, and air dried. One panel was dipped in each solution and dried on 60° C. for 10 minutes.

Example 24

This example demonstrates a coating composition comprising a urethane polymer with 50 wt. %/50 wt. % silica containing solution comprising sodium silicate (N-grade), aqueous colloidal silica (Ludox® AM 30) and an organometallic surfactant (Ken-React NZ 38J). A 100 ml of the 50/50 silica containing solution was mixed and added to a commercially available urethane polymer (Zeneca Resins) to obtain the following compositions:

| 5% 20 ml 50/50 | 10% 20 ml 50/50 | 15% 20 ml 50/50 |
|----------------|-----------------|-----------------|
| 1.0 g urethane | 2.2 g urethane  | 3.5 g Urethane  |

Three (3) cold roll steel 1×4×0.032 coupons were cleaned with naphtha and reagent alcohol, and air died. One coupon was dipped in each of the 5, 10, and 15% solutions and oven dried at 60° C. for 10 minutes. Coupons were also dipped in each of the solutions and oven dried at 110 C. for 10 minutes. All of the oven dried coupons were visually inspected and determined to have adhesion between the coupons and coatings.

Example 25

The borate containing composition of Example 17 was prepared. One weight (1 wt. %) of each of the following materials was added to 20 ml of the borate containing composition:

1) aluminum oxide,
2) zirconium silicate,
3) magnesium silicate,
4) kaolin,
5) potassium silicate,
6) sodium silicate,
7) calcium silicate,
8) sodium aluminate,
9) bentonite.

These materials were blended by hand and applied upon ACT steel coupons. The steel coupons were dipped by hand in the blended materials and heated in an oven under atmospheric conditions at 60 C. for 10 minutes. The coated coupons were removed and visually inspected. Each coupon had an adherent coating.

What is claimed is:

1. A method of treating a metal containing surface comprising:
   cleaning at least a portion of the metal containing surface,
   contacting at least a portion of the metal containing surface with at least one silica containing composition having a basic PH,
   contacting with a molten metal, and;
   recovering a treated metal containing surface.

2. A method for treating a metal containing surface comprising at least one shaped electronic component defining at least one opening therein comprising:
   contacting at least a portion of the component with a coating composition having a basic pH and comprising at least one silica containing composition, or at least one borate containing composition comprising boric acid,
   containing with a molten metal, and;
   recovering at least one treated electronic component.

3. The method of claim 2 wherein the composition comprises a combination comprising at least one silica containing composition or at least one borate containing composition, and at least one carrier.

4. The method of claim 3 wherein said the combination comprises a silica containing composition comprising a combination comprising silica and at least one silicate, and said carrier comprises at least one water soluble polymer.

5. The method of claim 1 wherein said metal containing surface comprises at least one member selected from the group consisting of at least one electric motor laminate, at least one electric motor stator laminate and at least one transformer laminate, and said at least one member is assembled with other members in manner to be adjacent to each other and define at least one opening extending through the assembled members, and subsequent to said assembly said silica containing composition contacts at least a portion of said opening.

6. The method of claim 2 wherein said composition comprises a combination comprising silica and at least one silicate, and said carrier comprises at least one water soluble polymer.

7. The method of claim 2 wherein the composition comprises a borate containing composition comprising a combination comprising boric acid and sodium tetraborate.

8. The method of claim 1 wherein said at least one molten metal comprises aluminum.

9. The method of claim 2 wherein said at least one silica or borate containing composition forms an electrically resistive coating.

10. The method of claim 2 further comprising applying a secondary coating upon at least a portion of the coating composition.

11. The method of claim 3 further comprising ferromagnetic particles.

12. The method of claim 3 further comprising at least one member chosen from the group of boron nitride, aluminum nitride, silicon carbide, silicon nitride and carbon.

13. The method of claim 2 wherein at least a portion of said composition forms an intumscent coating.

14. The method of claim 10 wherein said secondary coating comprises silica.

15. The method of claim 3 wherein said carrier comprises at least one water soluble polymer comprising at least one member chosen from the group of urethanes and acrylics.

16. The method of claim 2 wherein said at least one molten metal comprises aluminum.

17. The method of claim 16 wherein said molten aluminum reacts with at least a portion of said coating composition.

18. The method of claim 1 wherein the composition further comprises sodium aluminate.

19. The method of claim 3 wherein the composition comprises a borate containing composition comprising boric acid and sodium tetraborate.

20. The method of claim 1 or 2 wherein the metal surface comprises at least one member selected from the group of an electric motor, a transformer and components thereof.

21. The method of claim 1 wherein said cleaning comprises contacting the metal containing surface with at least one member selected from the group consisting of hydrogen peroxide, alcohol, methyl soyate, d-limonene and an acidic solution.

22. A method for making an electric motor component comprising a plurality of adjacent laminates, the method comprising:

preparing at least one laminate wherein said laminate defines at least one opening, preparing a coating composition comprising at least one silica containing composition and having a basic pH, contacting at least a portion of said laminate with the coating composition, preparing an assembly comprising adjacent laminates, contacting at least a portion of the assembly with at least one molten metal, and;

recovering at least one electric motor component.

23. A method for making an electric motor component comprising at least one member selected from the group consisting of stacked electric motor rotor laminates, staked electric motor stator laminates, and staked transformer laminates wherein said a least one component comprises a plurality of adjacent laminates, the method comprising:

preparing said at least one member wherein said member defines at least one channel extending therethrough, preparing a coating composition comprising at least one silicate containing composition and having a basic pH, contacting at least a portion of said at least one channel with the coating composition, contacting at least a portion of said at least one member with at least one molten metal, and;

recovering at least one electric motor component.

24. A method of treating a metal containing surface comprising:

cleaning at least a portion of the metal containing surface, contacting at least a portion of the metal containing surface with a composition comprising a combination comprising at least one silica containing compound and sodium aluminate, contacting with a molten metal, and;

recovering a treated metal containing surface.

25. a method for treating a metal containing surface comprising at least one shaped electronic component defining at least one opening therein comprising:

contacting at least a portion of the component with a coating composition comprising a combination comprising at least one silica containing compound and ferromagnetic particles, contacting with a molten metal, and;

recovering at least one treated electronic component.

\* \* \* \* \*